United States Patent Office 3,144,857
Patented Aug. 18, 1964

3,144,857
DIESEL ENGINE OPERATION
Howard E. Hesselberg, Birmingham, Mich., assignor to Ethyl Corporation, New York, N.Y., a corporation of Virginia
No Drawing. Filed Oct. 27, 1961, Ser. No. 148,050
6 Claims. (Cl. 123—27)

This invention relates to a method of operating an internal combustion engine. More particularly, the invention relates to an efficient and economical operation of diesel engines adapted to operate on a dual fuel cycle.

For the purpose of this iunvention, dual fuel engines are defined as compression ignition engines which use as a portion of the fuel supply, a normally gaseous material (hereinafter also referred to as the primary fuel) such as natural gas, liquefied petroleum gas, methane, ethane, propane, etc. Ignition of the gaseous primary fuel is accomplished by the injection of a charge of diesel fuel (hereinafter also referred to as pilot charge) into the compressed gas mixture. Thus, normal dual fuel operation comprises induction of a primary fuel-air mixture into the combustion chamber, compressing this mixture by means of the compression stroke, and at some point during the compression stroke, injecting a pilot charge of diesel fuel into the compressed primary fuel-air mixture. The pilot charge of diesel fuel is injected through a conventional diesel fuel injection system and acts as a source of ignition for the compressed fuel-air mixture. In normal dual fuel operation, air to the engine is not throttled but is constant. Power output from the engine is controlled by varying the amount of gaseous fuel admitted into the combustion chamber. For a given engine, the quantity of the pilot charge of diesel fuel per cycle is usually fixed, regardless of engine output. At full load the amount of the pilot charge usually represents less than 10 percent of the total fuel to the engine.

One of the main incentives for using a dual fuel cycle is economy. Many widely available gaseous fuels are much cheaper than conventional diesel fuel. Moreover, using gaseous fuels allows smoother, cleaner combustion with a minimum of combustion chamber deposits. Engine maintenance costs are reduced and engine life is prolonged.

In many instances operating a compression ignition engine on the dual fuel cycle results in a severe penalty, for only a fraction of maximum power is available as compared with operating the engine as a full diesel. The sharp reduction in power output is due to a loss of combustion control. This loss of combustion control is evidenced by rough operation, audible noises, combustion knock, etc. This is very objectionable for it results in shock loading of pistons, bearings, and other engine parts as well as loss in power output. To avoid this loss of combustion control, engine manufacturers have had to limit the power output of the engine. This is accomplished by reducing the amount of primary fuel introduced into the combustion chamber during each cycle which in turn results in lower power output.

The fact that the use of certain gaseous fuels in a dual fuel operation results in loss of combustion control has long been recognized. As far back as 1898, Rudolph Diesel recognized this problem. In his British Patent No. 7,657 claiming the method of operating an internal combustion engine on a dual fuel cycle, he stated that he could use "illuminating gas . . . however only in small proportion to the air." In other words the amount of fuel had to be reduced or limited to retain combustion control. Thus, for a period of over 60 years, this problem of loss of combustion control when using a dual fuel cycle has plagued the industry. The problem has not been solved but only circumvented by accepting the penalty of limiting the power output of the engine to avoid the problems associated with combustion control loss.

It is an object of this invention to provide a method of operating a dual fuel engine in an economical and efficient manner. Another object is to provide a method whereby the power output available from a dual fuel engine is equal to or greater than the maximum power available when operating under full diesel conditons.

It has now been found that surprisingly, a material normally used as an antiknock agent in gasoline fuels for spark-ignited engines can be used as a combustion control improver in compression ignition engines operated on a dual fuel cycle. Accordingly, the objects of this invention are accomplished by the method of this invention which method comprises the steps of:

(1) Introducing into the combustion chamber of a compression ignition engine a gaseous fuel and air to form a combustible mixture, (2) Compressing said mixture to from about $\frac{1}{12}$ to about $\frac{1}{22}$ of its original volume so as to raise the temperature of said mixture to a level sufficient to ignite diesel fuel, (3) Injecting into the combustion chamber a pilot charge of diesel fuel so as to initiate combustion of the total mixture, the weight ratio of said pilot charge to said gaseous fuel being from about 0.01:1 to about 1:1, said pilot charge being characterized by containing from about 1.0 to about 15 grams per gallon of a metal having an atomic number of 25 to 28 as a hydrocarbon-soluble, carbon-containing compound having the metal atom coordinated to the organic portion of the molecule by a plurality of metal-to-carbon bonds; said pilot charge optionally containing from 0.1 to about 15 grams per gallon of lead as a tetraalkyllead compound having alkyl groups containing from one up to about 8 carbon atoms; the organometallic compounds are further characterized by being covalent, by possessing in addition to said metal only elements selected from the group consisting of carbon, oxygen, hydrogen and nitrogen, by containing at least one group selected from the class consisting of cyclopentadienyl groups and the carbonyl group, and by containing from about 5 to 20 carbon atoms in the molecule.

The metals of atomic numbers 25 to 28 are manganese, iron, cobalt and nickel. These metals, in the form of hydrocarbon soluble compounds, may be added singly or in combination to the diesel fuel pilot charge. A tetraalkyllead compound can also be added. However, in order to effectively practice the method of this invention, it is essential that the diesel fuel pilot charge contain at least about one gram of a metal of atomic number 25 to 28 as a hydrocarbon-soluble compound.

The inclusion of a material normally used as an antiknock material in the diesel fuel pilot charge permits much greater power to be developed than heretofore possible. By the use of the method of this invention, combustion control is retained, allowing operation of the dual fuel engine in a manner so as to obtain much more power than that possible in the absence of a combustion control improver. This is surprising for the art has long recognized that organometallic antiknock compounds such as those of lead, manganese, etc., although useful in gasoline fuels used for spark-ignited engines, were not useful but in some respects even harmful when included in diesel fuel. In order to understand the import of this statement, it is necessary to consider the diesel combustion process.

In diesel operation combustion control is mainly obtained by the rate at which diesel fuel is injected into hot, compressed air. The fuel particles, upon contact with the high-temperature air within the combustion chamber, do not ignite instantaneously but there is a "delay period" of several thousandths of a second between the start of fuel injection and the time that the fuel particles are ignited. Burning then proceeds in a manner determined by the rate and the total quantity of fuel injected into the air charge. Under proper conditions, the burning produces a smooth, even pressure rise in the combustion chamber. The ignition delay period is critical, for if the fuel does not ignite within the proper interval, too large an amount of fuel will have been mixed with the air charge. When ignition does take place, the larger amount of fuel will burn in a relatively short time, resulting in an abnormal, high rate of pressure rise. A long ignition delay period also allows time for pre-flame reactions to take place in the fuel-air mixture before ignition occurs and the reactions result in products which burn then with extreme rapidity, further contributing to the excessive, rapid pressure rise. The rate of pressure rise may become so rapid that rough engine operation, evidenced by loss of power, combustion knock, etc. will occur. Also with a cold engine and with low intake air temperatures, too long a delay period produces misfiring and uneven or incomplete combustion with consequent smoke and loss of power.

With a proper ignition delay period, ignition occurs before the pre-flame reactions have proceeded and when the proper amount of fuel has been injected into the air charge, producing a smooth, gradual pressure rise.

The ignition delay period is associated with the chemical composition of the fuel. Ignition delay characteristics are so important that diesel fuel specifications almost universally include an ignition delay characteristic. In an engine test procedure under ASTM Designation D–613–48T, the ignition delay characteristics of the diesel fuel are compared with those of two pure hydrocarbon reference fuels, cetane and α-methylnaphthalene. Cetane has a very high ignition quality (short ignition delay period) and, accordingly, is designated at the top of the scale with a cetane number of 100. α-Methylnaphthalene has an exceedingly low ignition quality (long ignition delay period) and represents the bottom of the scale with a cetane number of zero. Blends of these two hydrocarbons represent intermediate ignition qualities and their cetane number is the percentage of cetane in the blend. The ignition delay characteristics of the diesel fuel are matched with those of the blend and a cetane number is accordingly assigned to the diesel fuel.

With spark-ignited internal combustion engines, the primary fuel characteristic is octane number. This is the measure of the ability of a fuel to resist pre-spark or uncontrolled and erratic combustion. As with diesel fuel, the end objective is to control combustion so as to obtain a smooth, even pressure rise. The term designating this quality is known as octane number. The resistance of the fuel to pre-flame combustion, uncontrolled combustion, etc. usually known as knock, is compared with that of isooctane, the top of the scale, and n-heptane, the bottom of the scale. A single-cylinder engine is operated in accordance with the standard ASTM procedure and the antiknock quality of the fuel is matched with that of a blend of isooctane and heptane. The percentage of isooctane in the blend having the same antiknock properties as those of the fuel is assigned as the fuel octane number. The higher the octane number the more desirable the fuel.

Thus, with normal diesel fuel operation, in order to retain combustion control, the desirable fuel quality is ability to ignite within a fairly short time, whereas with spark-ignited engines the desirable fuel quality is ability to resist combustion until ignited by the spark. From these considerations it would be expected, and the art recognizes, that a good diesel fuel would make a poor fuel for spark-ignited engines and vice versa. This is verified from the literature. "Knock Characteristics of Hydrocarbons" by W. G. Lovell, published in "Industrial and Engineering Chemistry," vol. 40, No. 12, December 1948, presents research octane numbers for a variety of pure hydrocarbons. "Combustion Characteristics of Compression Ignition Engine Fuel Components" by D. R. Olsen et al., presented at the SAE National Fuels and Lubricants meeting, November 2, 1960, Tulsa, Oklahoma, reports cetane numbers for various hydrocarbons. Cetane numbers and octane numbers for pure hydrocarbons common to both of the aforementioned papers are presented in Table I.

TABLE I

*Octane and Cetane Number Comparison*

| Hydrocarbon | Cetane Number [1] | Octane Number |
|---|---|---|
| Heptane | 41 | 0 |
| 2-Octene | 39.2 | 56.3 |
| n-Hexane | 39 | 24.8 |
| 1-Hexene | 36.1 | 76.4 |
| Cyclohexane | 34.2 | 83 |
| 2,2,4-Trimethylpentane | 33.7 | 100 |
| Ethyl Benzene | 31.5 | 107.4 |
| Toluene | 31.3 | 120.1 |

[1] Cetane numbers were determined for the indicated hydrocarbon in a concentration of 20 percent in a base fuel composed of 25 percent n-cetane and 75 percent isooctane. The base fuel had a cetane number of 38.

The data of the above table clearly demonstrate that fuels most suited for diesel operation are the least desirable for spark ignition operation. Heptane, which has the highest cetane number of the materials shown, has the lowest octane number. Conversely, toluene, which has the lowest cetane number, has an exceedingly high octane number.

The effect of including organometallic antiknock compounds in diesel fuels is shown in Table II. Methylcyclopentadienyl manganese tricarbonyl and tetraethyllead (TEL), materials used in commercial fuels for spark ignition engines, were added to several different diesel fuels and the cetane number was determined in accordance with ASTM Test Designation D–613–48T.

TABLE II

*Effect of Organometallic Antiknock Compounds on Diesel Fuel Cetane Number*

| | Cetane Number | | | |
|---|---|---|---|---|
| | Mn, gm./gal. as methylcyclopentadienyl manganese tricarbonyl | | | |
| | 0.0 | 0.02 | 0.04 | 0.08 |
| Fuel 1 | 53.8 | 53.1 | 52.6 | 52.0 |
| Fuel 2 | 49.6 | 48.6 | 47.9 | 47.1 |
| Fuel 3 | 55.9 | 53.4 | 53.2 | 51.9 |
| Fuel 4 | 43.5 | 43.0 | 41.5 | |

| | Tetraethyllead, Wt. Percent | | | | | |
|---|---|---|---|---|---|---|
| | 0.0 | 0.1 | 0.25 | 0.50 | 1.0 | 2.0 |
| Fuel 5 | 33.0 | 27.2 | 24.2 | 23.0 | 21.2 | 20.0 |

Thus, methylcyclopentadienyl manganese tricarbonyl and tetraethyllead, although widely used to improve the combustion properties of gasoline, have an opposite and adverse effect on cetane number of diesel fuel.

The data of Tables I and II thus amply demonstrate what is well known to those skilled in the art—that spark ignition engines and compression ignition engines are opposites; that cetane numbers and octane numbers bear an inverse relationship; and that the most desirable fuels for efficient operation of spark-ignited engines are the least desirable for efficient operation of diesel engines. This is true whether the cetane numbers and octane numbers are due to the inherent properties of the hydrocarbon constituents or due to the addition of chemical additives. In other words, it has been well known that those hydrocarbon components and chemical additives which produce a beneficial effect in gasoline-type fuels produce an adverse effect with respect to combustion control when included in diesel fuels. Contrary to the teachings of the prior art, it has now been discovered that materials normally used for antiknock purposes in gasoline can be used as combustion control improvers to markedly increase the power output of a compression ignition engine operated on a dual fuel cycle. In short, contrary to prior art teachings, primary fuels of lower cetane numbers are desirable for maximum power output of a dual fuel compression ignition engine.

Included within the scope of the combustion control improvers of this invention are organic compounds of a metal having an atomic number of from 25–28 as a hydrocarbon soluble, carbon-containing compound—preferably a cyclopentadienyl manganese tricarbonyl—having the metal atom coordinate to the organic portion of the molecule by a plurality of metal-to-carbon bonds. The compounds are further characterized by being covalent, by possessing in addition to the said metal only elements selected from the class consisting of carbon, oxygen, hydrogen and nitrogen, by containing at least one group selected from the class consisting of cyclopentadienyl groups and the carbonyl group, and by containing from 5 to 20 carbon atoms in the molecule. Examples of these compounds include the simple metallic carbonyls— e.g., iron carbonyl ($Fe(CO)_5$); nickel carbonyl ($Ni(CO_4)$); cobalt carbonyl, ($Co_2(CO)_8$); manganese carbonyl, $Mn_2(CO)_{10}$); the simple cyclopentadine derivatives—e.g., dicyclopentadienyl iron, dicyclopentadienyl nickel dicyclopentadienyl manganese, and analogous compounds where one or both of the cyclopentadiene rings is alkyl-substituted; the mixed cyclopentadienyl metal compounds—e.g., the particularly preferred compounds cyclopentadienyl manganese tricarbonyl, methylcyclopentadienyl manganese tricarbonyl, etc.; and the olefinically coordinated metallic carbonyl compoundss—e.g., butadiene iron tricarbonyl, etc.

The preferred manganese compounds are the cyclopentadienyl manganese tricarbonyls as described for example in U.S. Patents 2,818,416 and 2,818,417. Illustrative of these compounds are cyclopentadienyl manganese tricarbonyl; methylcyclopentadienyl manganese tricarbonyl; indenyl manganese tricarbonyl; manganese pentacarbonyl; and so on.

The preferred nickel compounds are of the type as described in U.S. Patent 2,818,416. These include cyclopentadienyl nickel nitrosyl; methylcyclopentadienyl nickel nitrosyl; indenyl nickel nitrosyl and the like.

The preferred iron compounds of this invention are the di-cyclopentadienyl iron compounds; e.g., biscyclopentadienyl iron; bis-methylcyclopentadienyl iron; bis-butylcyclopentadienyl iron. Other compounds such as iron pentacarbonyl and butadiene iron tricarbonyl are also effective.

The preferred cobalt compounds include the cobalt carbonyls such as cobalt tetracarbonyl; cyclopentadienyl cobalt dicarbonyl; 1-pentyne-cobalt tetracarbonyl and cobalt pentacarbonyl mixed complexes.

The diesel fuels of this invention may also contain a tetraalkyllead compound. However, in order to practice the method of this invention, lead compounds are included only when the diesel fuel contains the requisite 1 to 15 grams of a metal of atomic numer 25–28 as a compound defined above. The usable lead compounds are lead alkyls wherein each alkyl group contains up to about 8 carbon atoms and includes compounds such as tetramethyllead, tetraethyllead, tetraisopropyllead, tetrapropyllead, tetrabutyllead, tetramyllead, tetraoctylled, dimethyldiethyllead, hexyltriethyllead, methyltriethyllead and the like. The phenyl and mixed phenyl-alkyl compounds such as tetraphenyl, trimethylphenyl, diphenyldiethyl, triphenylpropyl, etc. are also usable. The compounds are usable in a concentration of from 0.1 to about 15 grams of lead per gallon of diesel fuel.

The preferred compounds of this invention are the hydrocarbon cyclopentadienyl manganese tricarbonyl compounds. These compounds include cyclopentadienyl manganese tricarbonyl itself, methylcyclopentadienyl manganese tricarbonyl, diisopropylcyclopentadienyl manganese tricarbonyl, indenyl manganese tricarbonyl, phenylcyclopentadienyl manganese tricarbonyl, methylisopropylcyclopentadienyl manganese tricarbonyl and the like. These compounds are completely compatible with diesel fuel and are extremely effective in increasing the available power from a compression ignition engine operated on a dual fuel cycle. A preferred concentration range for these materials is from about 2 to 8 grams of metal per gallon of diesel fuel. In this range the additives are exceptionally effective on a cost basis. Likewise, the iron, cobalt and nickel compounds are effective within this preferred range. The lead alkyl compound used in the presence of a manganese, iron, cobalt or nickel additive or a combination of these additives are preferably present in a concentration of from about 1 to about 6 grams per gallon of diesel fuel.

The gaseous primary fuels usable in the method of this invention broadly include any material which is normally gaseous at ambient pressure and temperature and which is capable of being ignited in an internal combustion engine. This includes materials such as natural gas, well head gas, sewer gas, coal gas, water gas, producer gas, coke oven or blast furnace gas, liquefied petroleum gases and hydrocarbon gases. The preferred primary fuels are hydrocarbons containing from one to 4 carbon atoms including methane, ethane, ethylene, propane, propylene, butane, butylene, and mixtures thereof. A specific mixture of these light hydrocarbon gases, known as liquefied petroleum gas (LPG) is also preferred. LPG is mainly liquid propane, propylene, butane or mixtures thereof, sometimes containing trace quantities of ethane, isobutane, pentane and/or isopentane.

The primary fuel may also contain other additives. Typical of these are antioxidants, (e.g., N,N-di-sec-butyl-p-phenylene diamine; p-N-butylaminophenol; 4-methyl-2, 6 - di-tert-butylphenol; 2,6-di-tert-butylphenol); metal deactivators, (N,N-disalicylidene - 1,2 - diaminopropane, etc.); dyes phosphorus additives (e.g., tri-$\beta$-chlorophopyl thionophosphate; dimethyltolyl phosphate; dimethylxylyl phosphate; phenyldimethyl phosphate; tricresyl phosphate; trimethylphosphate, etc.); halohydrocarbon scavenging agents such as ethylene dibromide, ethylene dichloride, methyl bromide, methyl chloride, etc.

The diesel fuel base stocks used for the pilot injection fuel pursuant to the invention can be derived from a wide variety of crude sources. Furthermore, the diesel fuel may be made up of straight run diesel fuels, catalytically cracked stocks, No. 2 burner oils, light residual stocks and the like. These diesel fuels fall within the boiling range of from about 300 to 725° F., with intermediate fractions boiling at temperatures between these limits. The initial and final boiling points of the diesel fuels may vary to some extent from the above limits depending upon the grade of diesel fuel, its source, and its method of manufacture and formulation. Generally, any of the commercial-type available diesel fuels may be used as the pilot charge in the method of this invention. The cetane number may vary from about 30 to 65. In order to insure proper ignition, it is desirable that the diesel fuel have a cetane number of at least about 40.

The diesel fuels may also contain other additives such as stabilizers; stability-compatibility agents; cetane improvers such as alkyl nitrates (amyl nitrate); phosphate esters; corrosion inhibitors; metal deactivators; dyes; and the like. Amounts of these additives in the range of from about 0.001 to about 2 percent based on the weight of the diesel fuel are usually effective.

The relative amounts of diesel fuel pilot charge and primary fuel can vary over wide limits. A minimum amount of the diesel pilot charge will be required to provide continuous and efficient ignition of the total charge.

This amount is usually at least 1 percent of the total fuel. While the pilot charge can be increased to about 50 percent or more of the total fuel, to obtain the maximum benefits of this invention the pilot charge should be less than 50 percent. A preferred range for the diesel pilot charge is from about 2 to about 10 percent of the total fuel charge at full load.

The fuel-air ratios for the practice of this invention are subject to wide variations. In the compression ignition cycle, air is not throttled but is set at a somewhat constant rate. Since power output is controlled by throttling the fuel, air-fuel ratios vary with power demand. Under idling conditions air-fuel ratio may be as high as 100:1, while under full load conditions the mixture may be considerably enriched so as to have air-fuel ratios as low as about 13:1. The optimum air-fuel ratios under full load are of the order of from about 17:1 to 14:1.

The compression ratios of the engines must be high enough to raise the temperature of the compressed air to a level so as to ignite the diesel fuel pilot charge. Thus the compression ratio should be at least about 12:1. Higher compression ratios may be used but at ratios higher than about 22:1 additional problems are presented. The engine must be designed so as to withstand extremely high temperatures and pressure, and the diesel fuel injection system must be capable of injection at these high pressures.

This invention is applicable to two-cycle and four-cycle diesel engine operation. In the two-cycle engine, the gaseous fuel is introduced into the combustion chamber after the scavenging operation has been completed. In other words, the gaseous fuel is introduced after the piston has covered the intake ports on its upward stroke and the exhaust valves (or exhaust ports) have been closed. During and after this introduction, the piston continues its upward stroke thereby compressing the air-gaseous fuel mixture.

At some point, usually before top dead center, the pilot injection of the dieself fuel is made and compression ignition initiated. In four-cycle engine operation, the gaseous fuel can be supplied to the air intake manifold or it can be introduced through a valve into the combustion chamber as in the case of the two-cycle engine.

The method of this invention and the benefits obtained therefrom are illustrated by the following examples.

EXAMPLE I

A Hercules diesel model DD–169–H; 16.2:1 compression ratio, four-cycle, 169 cubic inch direct injection engine was used in these tests. The engine was equipped with a Bosch variable injection timing fuel system. The engine was converted so as to be operable both as a full diesel and also on a dual fuel cycle. Provisions were made to allow the use of either LPG-type fuels or natural gas as the primary fuel.

Provisions were made to detect loss of combustion control by use of a Kistler Model 601 pressure transducer in one cylinder of the engine. The same transducer was used for pressure-time trace display on a duel beam oscilloscope. The engine was coupled to a D.C. dynamometer and air consumption was measured by a smooth approach orifice head of a surge tank.

Engine speed was maintained at 1600 r.p.m., intake air temperature was ambient in the dynamometer room, and engine jacket temperature was controlled at 170° F. The engine was operated as a full diesel and also using a dual fuel cycle. Under dual fuel operation, the amount of diesel pilot charge was maintained constant at about 1.8 pounds of diesel fuel per hour. Propane was used as the primary gaseous fuel. The obtainable brake horsepower as limited by loss of combustion control was measured.

The engine when operated as a full diesel according to the manufacturer's specification, developed 34 horsepower at a diesel fuel consumption rate of 13.3 pounds per hour.

The engine was then operated on a duel fuel cycle using propane as the primary gaseous charge. The quantity of propane metered into the combustion chamber was increased until combustion control was lost. This was evidenced by high frequency vibrations on a pressure-time trace or on a $dp/dt$ trace on an oscilloscope screen. It was also possible to detect combustion knock audibly. Operating under these conditions on a dual fuel cycle, the engine developed 22.4 horsepower when loss of combustion control occurred. This represents only about 66 percent of the power obtained by operating the engine as a full diesel.

Six-tenths grams of manganese per gallon as methylcyclopentadienyl manganese tricarbonyl was added to the diesel pilot charge, and the engine was operated on a dual fuel cycle. Available power, as limited by loss of combustion control, was not increased but remained at 22.4 horsepower.

The concentration of the manganese additive was increased so that the diesel fuel contained 6.0 grams of managanese per gallon. The engine was again operated on a dual fuel cycle. The available power, as limited by loss of combustion control, was increased to 25.3 horsepower. This represents an increase of 13 percent as compared to the power obtainable when operating the engine on a dual fuel cycle using a diesel pilot charge void of or containing 0.6 gram of manganese per gallon.

This example demonstrates that in order to increase the available horsepower of a dual fuel compression ignition engine, an amount greater than 0.6 gram of manganese per gallon of diesel fuel pilot charge is required. Significant gains are obtained when the pilot charge contains 6.0 grams of manganese as methylcyclopentadienyl manganese tricarbonyl per gallon of diesel fuel.

EXAMPLE II

The engine is operated in accordance with the procedure of Example I. However, 1.0 gram of manganese is added to the diesel fuel pilot charge. It is found that operating on a dual fuel cycle, the available power using 1.0 gram of manganese per gallon of pilot charge is significantly greater as compared to using a pilot charge void of, or containing 0.6 gram of manganese per gallon of pilot charge.

EXAMPLE III

The engine of Example I is operated on a dual fuel cycle using natural gas as the primary charge, and an untreated diesel fuel having a cetane number of 40 as the pilot charge. To the diesel fuel is then added 8 grams of iron per gallon as dicyclopentadienyl iron and 3 grams of lead per gallon as tetraethyllead. Under full load conditions, the pilot charge rate is such that the weight ratio of diesel pilot charge to gaseous primary fuel is about 0.01:1. It is found that the available power is significantly increased and is essentially equal to that obtainable when operating the engine as a full diesel.

EXAMPLE IV

The engine of Example I is operated on a dual fuel cycle using commercially-available petroleum gas (LPG) as the primary gaseous fuel. It is found that the available power is markedly reduced as compared with operating as a full diesel. To the diesel fuel pilot charge having a cetane number of 35 is added 6.0 grams of nickel per gallon as cyclopentadienyl nickel nitrosyl and 2 grams per gallon of cobalt as cobalt carbonyl. As in the previous examples, the primary fuel rate is increased until loss of combustion control is encountered. Under full load conditions, the pilot charge and primary fuel rates are such that the weight ratio of pilot charge to primary fuel is about 1:4. It is found that under these conditions the available power is markedly greater than that obtainable when operating on a dual fuel cycle but using untreated diesel fuel as the pilot charge.

EXAMPLE V

A 16-cylinder, 2-cycle, V-type railroad diesel engine rated at 1500 horsepower at 800 r.p.m. is used in this example. Its bore and stroke is 8½" x 10" and the piston displacement is 467 cubic inches per cylinder. The engine is equipped with Roots-type blowers to furnish scavenge and combustion air to the cylinders through ports which are uncovered by the pistons while approaching bottom dead center. Exhaust gases and scavenge air escape through four poppet valves in each cylinder head. This engine is modified for dual fuel operation as follows:

The compression ratio is reduced from 16:1 to 13.5:1. The engine is equipped with a gas manifold leading to a gas inlet poppet valve in each cylinder head. This manifold is in turn connected to a tank containing the primary fuel, in this case essentially pure propane held under pressure. The connecting means between the tank and the gas inlet manifold are adjusted so that the supply of the propane to the engine is maintained at 25 to 30 p.s.i. which is sufficient to cause flow through the gas inlet poppet valves. These valves are actuated by a conventional cam and operating mechanism. Also, the fuel injection nozzle is centrally located in the cylinder head and sprays downward into the combustion chamber in the piston. The shape of this chamber is such that there is a four-inch diameter cavity which is about two inches deep. The nozzle has six holes of 0.011 inch diameter.

In operation the gas inlet valve starts to open at 51° after bottom dead center—i.e., just after port closing. The gas valve closes at 115° after bottom dead center. The charge in the cylinder is fired by the injection of the diesel fuel at 4° before top dead center. In this particular example, 7 percent of the total fuel charge is the diesel fuel so injected. It is found that when the diesel fuel is a conventional additive-free fuel of 45 cetane number, the maximum power output of this engine is only about 70 percent of that obtained when operating solely on diesel fuel in the conventional manner.

A diesel fuel for this invention is prepared by blending with the above diesel fuel base stock 6 grams of lead per gallon as tetraethyllead and 1.0 gram of manganese per gallon as methylcyclopentadienyl manganese tricarbonyl. When this fuel is used in the above dual fuel setup, the increase in power output is markedly improved.

Another diesel fuel for this invention is prepared by blending with the above diesel fuel base stock 10 grams of methylcyclopentadienyl manganese tricarbonyl per gallon. This is equivalent to a manganese content of 2.5 grams per gallon. When this fuel is used in the above duel fuel setup, similar results are obtained and power output is markedly improved.

EXAMPLE VI

The procedure of Example V is repeated using a 65 cetane number diesel fuel in the control run and natural gas as the primary fuel. It is found that the maximum power output of the diesel unit is significantly less than that obtained when operating as a full diesel fuel. However, when this diesel fuel base stock is treated with tetramethyllead and dicyclopentadienyl iron at concentrations of 3 grams of iron and 3 grams of lead per gallon, entirely opposite results are achieved. That is, the maximum power output of the diesel unit is virtually equivalent to that achieved when the unit is operated on a single fuel system with conventional 65 cetane diesel fuel.

Another diesel fuel of this invention is prepared by adding to the diesel fuel base stock 10 grams of manganese per gallon as dicyclopentadienyl iron. Similar improvements in available power are obtained.

EXAMPLE VII

The procedure of Example V is repeated with these exceptions: Instead of essentially pure propane, the gaseous fuel is 80 percent propane and 20 percent butane; the diesel fuel has a cetane number of 55; the diesel fuel of this invention made from this diesel fuel contains 1 gram of lead per gallon as tetraoctyllead and 3 grams of nickel per gallon as nickel carbonyl and the diesel fuel is injected at 10° before top dead center. Substantial improvements in power output are achieved from the use of this leaded, nickel-containing fuel with the propane-butane mixture.

Another fuel of this invention is prepared by adding to the above described diesel fuel 5 grams of nickel as nickel carbonyl. Substantial improvements in power output are achieved from the use of this nickel-containing fuel.

EXAMPLE VIII

The procedure of Example V is repeated with these changes: The gaseous fuel is natural gas introduced into the engine at a pressure of 45 p.s.i.; the diesel fuel has a clear cetane value of 35, and in the case of the diesel fuel of this invention, it contains 1.5 grams of iron per gallon as iron pentacarbonyl and 1.5 grams of lead per gallon as tetrabutyllead. As before, the power output of the diesel unit is substantially improved by the conjoint use of this leaded, iron-containing fuel with the gaseous fuel.

Another fuel of this invention is prepared by adding to the above diesel base fuel 7 grams of iron per gallon as iron pentacarbonyl. As before, the power output of the engine is substantially improved by the conjoint use of this iron-containing fuel with the gaseous fuel.

EXAMPLE IX

The procedure of Example I is repeated using a 55 cetane number diesel fuel. In one instance, this fuel is used without modification. In another instance, it is treated with butadiene iron tricarbonyl to a concentration of 3 grams of iron per gallon and with tetraethyllead to a concentration of 1 gram of lead per gallon and in a third instance, it is treated with butadiene iron tricarbonyl to a concentration of 4 grams of iron per gallon. With the latter two diesel fuels and the propane, the power output of the engine is substantially increased.

EXAMPLE X

The procedure of Example V is repeated as there described except that the diesel fuel of this invention contains 10 grams of lead per gallon as diethyldioctyllead and 2 grams of nickel per gallon as dicyclopentadienyl nickel, and this fuel is injected at 2° before top dead center. A good improvement in power output of the engine is achieved by using this leaded, nickel-conttaining fuel in conjunction with the gaseous fuel.

Similar improved results are obtained when the engine is operated on the above base fuel to which has been added 3 grams of nickel per gallon as dicyclopentadienyl nickel.

EXAMPLE XI

In these demonstrations, the diesel fuel used in the method of Example V has a cetane value of 28. The diesel fuel of this invention is made by adding tetraethyllead and cobalt carbonyl to this fuel at concentrations of 2 grams of lead and 1 gram of cobalt per gallon. The power output achieved by the use of this leaded, cobalt-containing fuel with the propane is substantially greater than that achieved from the base fuel.

Another fuel of this invention is prepared by treating the above base fuel with 8 grams of cobalt per gallon as cobalt carbonyl. Similar improvements are obtained when the engine is operated on this cobalt-containing fuel.

It is seen from the above examples that great benefits are achieved from this invention when the diesel fuel pilot charge contains from about 1.0 to about 15 grams of manganese, iron, cobalt, or nickel per gallon as a metallic carbon-containing compound in which the metal atom is coordinated to the organic portion of the molecule by a plurality of metal-to-carbon bonds. Additional benefits are obtained by also including in the pilot charge from 0.1 to about 15 grams of lead per gallon as a tetraalkyllead compound whose alkyl groups contain from 1 to about 8 carbon atoms. The former compounds are further characterized by containing carbonyl groups, cyclopentadienyl groups, or both. A plurality of these groups are attached to the central metallic atom by the coordinate metal carbon linkages. Another characterizing feature of many of these compounds is that by virtue of this coordination, the central metallic atom achieves the electron configuration of the inert gas, krypton, atomic number 36. This is readily understood by noting that each cyclopentadienyl radical donates five electrons to the metallic atom, whereas each carbonyl group donates two electrons.

Typical of these manganese, iron, cobalt and nickel compounds are di-(ethylcyclopentadienyl) nickel, di-(methylcyclopentadienyl) iron, di-(phenylcyclopentadienyl) iron, di - (isopropylcyclopentadienyl) manganese, iron tetracarbonyl, iron pentacarbonyl, cobalt carbonyl, manganese pentacarbonyl (i.e., dimanganese decacarbonyl), butadiene iron tricarbonyl and the like. Particularly preferred are the cyclopentadienyl manganese tricarbonyl compounds, such as cyclopentadienyl manganese tricarbonyl, methylcyclopentadienyl manganese tricarbonyl, diisopropylcyclopentadienyl manganese tricarbonyl, indenyl manganese tricarbonyl, phenylcyclopentadienyl manganese tricarbonyl, methylisopropylcyclopentadienyl manganese tricarbonyl and the like. These compounds are preferred because for one thing they are extremely powerful in promoting the release of the maximum possible power output for which the diesel engines were designed when used in the manner of this invention. They are also preferred because of their elegant inductibility properties, their exceedingly high solubility in diverse diesel fuel types and their uniquely beneficial co-action with the lead alkyls during the combustion process. Thus, in general the manganese, iron, cobalt and nickel compounds used in this invention have the additional characteristic of containing from 4 to about 17 carbon atoms in the molecule.

Methods for the preparation of the foregoing metal compounds have appeared in the literature. Thus, the preparation of lead alkyls by the alkylation of sodium-lead alloys is described in such patents as U.S. 2,635,107. A way of preparing manganese pentacarbonyl is described in U.S. Patent 2,822,247. The preparation of the other simple metallic carbonyls is so well known as to be matters of common knowledge in the chemical arts. References to the preparation of the simple cyclopentadienyl metal compounds are given in Rochow et al., "The Chemistry of Organometallic Compounds," John Wiley and Sons, Inc., New York, 1957. Preparation of the mixed cyclopentadienyl-carbonyl compounds including the preferred cyclopentadienyl manganese tricarbonyls is described in U.S. Patents 2,818,416 and 2,818,417. The olefinically coordinated iron tricarbonyls are made as described by Reihlen et al., "Annalen der Chemie," vol. 482, pages 161–182.

This application is a continuation-in-part of pending applications Serial No. 744,656, filed June 26, 1958, and Serial No. 744,657, filed June 26, 1958, both of which are now abandoned.

I claim:
1. A method of operating a compression ignition engine especially adapted to increase the available horsepower which comprises the steps of:
   (1) introducing into the combustion chamber of a compression ignition engine a gaseous fuel and air to form a combustible mixture,
   (2) compressing said mixture to from about $\frac{1}{12}$ to about $\frac{1}{22}$ of its original volume so as to raise the temperature of said mixture to a level sufficient to ignite diesel fuel,
   (3) injecting into the combustion chamber, a pilot charge so as to initiate combustion of the total mixture;
the weight ratio of said pilot charge to said gaseous fuel being from about 0.01:1 to about 1:1, said pilot charge being characterized by consisting essentially of diesel fuel containing from about 1.0 to about 15 grams per gallon of a metal having an atomic number of 25 to 28 as a hydrocarbon soluble, carbon-containing compound having the metal atom coordinated to the organic portion of the molecule by a plurality of metal-to-carbon bonds.

2. The method of claim 1 wherein said pilot charge additionally contains from 0.1 to about 15 grams per gallon of lead as a tetraalkyllead compound having alkyl groups containing from 1 to about 8 carbon atoms.

3. The method of claim 2 wherein said metal is a cyclopentadienyl manganese tricarbonyl compound.

4. The method of claim 1 wherein under full load conditions the weight ratio of said gaseous fuel to air is from about 1:14 to 1:17.

5. The method of claim 1 wherein said gaseous fuel is propane and said hydrocarbon soluble carbon-containing compound is methylcyclopentadienyl manganese tricarbonyl.

6. The method of claim 2 wherein said hydrocarbon soluble compound is methylcyclopentadienyl manganese tricarbonyl and said tetraalkyllead compound is tetramethyllead.

References Cited in the file of this patent
UNITED STATES PATENTS

| | | |
|---|---|---|
| 2,818,416 | Brown et al. | Dec. 31, 1957 |
| 2,822,247 | Hnizda | Feb. 4, 1958 |
| 2,909,159 | Britton | Oct. 20, 1959 |